United States Patent [19]

Alon

[11] Patent Number: 5,729,512
[45] Date of Patent: Mar. 17, 1998

[54] MAGNIFICATION AND TRACKING ERROR CORRECTION SYSTEM FOR MULTIPLE TRACK OPTICAL DISK READER

[75] Inventor: Amir Alon, Sunnyvale, Calif.

[73] Assignee: Zen Research N.V., Curacao, Netherlands Antilles

[21] Appl. No.: 675,526

[22] Filed: Jul. 3, 1996

[51] Int. Cl.$^6$ .................................................. G11B 7/095
[52] U.S. Cl. ........................ 369/44.32; 369/44.41; 369/44.23; 250/201.5
[58] Field of Search ................ 369/44.32, 44.26, 369/44.41, 44.42, 44.23, 44.36, 54; 250/201.5

[56] References Cited

U.S. PATENT DOCUMENTS

| | | | |
|---|---|---|---|
| 4,875,076 | 10/1989 | Torigoe et al. | 355/53 |
| 5,283,778 | 2/1994 | Maeda | 369/121 |
| 5,309,205 | 5/1994 | Hayano | 355/243 |
| 5,483,511 | 1/1996 | Jewell et al. | 369/44.37 |
| 5,493,553 | 2/1996 | Maurice et al. | 369/44.37 |
| 5,573,492 | 11/1996 | Dianna et al. | 356/4.03 |
| 5,602,383 | 2/1997 | Takekoshi et al. | 250/201.5 |

Primary Examiner—Thang V. Tran
Attorney, Agent, or Firm—Fish & Neave; Nicola A. Pisano

[57] ABSTRACT

Methods and apparatus are provided for generating focus, tracking, and magnification error signals in an multi-track optical disk reader. An optical pickup assembly for the disk reader includes an optical sensor having multiple sensor elements. Some of the sensor elements contain multiple divisions whose outputs are summed to produce tracking, focus, and magnification error signals. Electronic and optical mechanical systems are provided for correcting or compensating for magnification errors caused by an optical pickup assembly of a multi-track optical disk reader.

30 Claims, 7 Drawing Sheets

MAGNIFICATION AND TRACKING ERROR CORRECTION SYSTEM FOR MULTIPLE TRACK OPTICAL DISK READER

FIELD OF THE INVENTION

This invention relates to methods and apparatus for simultaneously reading multiple adjacent data tracks from an optical disk, and more particularly to methods and apparatus for detecting and compensating for focus, magnification, and tracking errors.

BACKGROUND OF THE INVENTION

Optical disks have become widely used in part due to their relatively high storage capacity. Whereas a 3½ inch floppy disk can store 1.44 Mb (megabytes) of data, a 12 centimeter compact (optical) disk can store upwards of 650 Mb. Optical disks have therefore become increasingly popular for data storage for personal computer systems, and may be either read-only CD-ROMs, recordable CDS, or multimedia discs, which combine music with multimedia content. Future developments promise to bring increased data storage capacity and faster access times to optical disk technology, increasing its value as a data storage media, such as the proposed Digital Video Disk format (DVD).

A CD generally includes a transparent plastic substrate having data encoded in pits that are impressed into the surface of the substrate along spiral or concentric data tracks. A metalization layer deposited on the pitted substrate provides a reflective surface, and a protective transparent layer is then deposited on the metalization layer. To read the data, light is reflected off of the metalization layer and sensed by a detector in an optical pickup assembly of the optical disk reader.

As the disk is rotated, pits along a data track sequentially pass under an illumination source. The presence of a pit in the data track causes destructive interference to occur between light reflecting from the pit and light reflecting from the area surrounding the pit. The intensity of the reflected light is thus modulated by the pattern of data pits in the disk substrate.

The modulated, reflected light is directed to a detector that develops electronic signals corresponding to the intensity of the reflected light. These electronic signals are then demodulated by processing circuitry to recover the digital information stored on the optical disk. Further details regarding the construction and use of optical disks can be found in *Compact Disc Technology*, Nakajima, H. and Ogawa, H., translated by Aschmann, C., published by Ohmsha, Ltd., Japan (1992), and *The Compact Disc Handbook*, Pohlmann, K., 2d. ed., A-R Editions, 1992.

The increased availability of CD-ROM products, coupled with the availability of increasingly faster microprocessors, has created a need for ever faster optical disk drives. As a result, disk drives capable of operating at speeds higher than that of a standard speed drive are becoming available. For example, drives having a spindle speed up to ten times (10×) the spindle speed of a standard drive are now available.

Previously known techniques for designing such high speed optical disk drives relied on increasing the rotational speed of the optical disk to reduce latency and increase data transfer rates. For example, in an 8×disk drive, the disk is rotated at speeds up to 4800 rpm when reading the innermost data track, compared to approximately 600 rpm in a standard speed drive. However, the ability to achieve even greater speeds may soon be limited by the ability of such technology to continue to provide low-cost, easily manufacturable systems, since the use of greater disk rotational speeds requires more sophisticated designs using tighter tolerances than employed in previously known arrangements.

An alternative to simply increasing the disk rotational speed is to read multiple data tracks simultaneously, as described in commonly assigned U.S. Pat. No. 5,426,623, the entirety of which is incorporated herein by this reference. In accordance with the methods and apparatus provided therein, for example, ten adjacent data tracks may be read simultaneously, resulting in a tenfold increase in the rate of reading data from an optical disk. Thus, even if the disk is rotated at only twice standard speed (i.e., a 2× drive is used), the capability to read ten tracks provides the equivalent of a 20× drive—almost three times faster than previously known disk drives.

However, implementation of simultaneous multiple track reading capability for optical disks presents new design challenges. For example, an optical disk is typically read by projecting an image of the disk surface onto an optical sensor in an optical pickup assembly. A multi-track optical reader may project an image of the disk surface onto a multi-element sensor such that adjacent data tracks are focused onto corresponding elements of the optical sensor. To correctly read data from an optical disk data track, an image of the track must be accurately focused onto an optical sensor element. Incorrect focus in an optical pickup assembly may project a blurred track image onto the optical sensor elements hindering recovery of the data recorded on the optical disk. In addition, tracking and magnification errors, as well as track pitch variations, may cause the image of some data tracks to be misaligned with the corresponding sensing element, resulting in data errors while reading a track.

It would therefore be desirable to provide methods and apparatus for generating signals indicative of the errors caused by focus, tracking, magnification, or pitch variation while reading multiple data tracks in an optical disk reader.

It would also be desirable to provide methods and apparatus for compensating for errors caused by focus, tracking, magnification, or pitch variation in a multi-track optical disk reader so that recorded data may be read accurately and reliably.

SUMMARY OF THE INVENTION

In view of the foregoing, it is an object of this invention to provide methods and apparatus for generating focus, magnification, and tracking error signals in an multi-track optical disk reader.

It is a further object of the invention to provide methods and apparatus to compensate for errors caused by focus, tracking, magnification, or track pitch variations in a multi-track optical disk reader so that recorded data may be read accurately and reliably.

In accordance with the principles of the present invention an optical pickup assembly is provided with a sensor having a plurality of optical sensor elements onto which a plurality of reflected track images are projected. Selected ones of the optical sensor elements include multiple divisions. Processing circuitry is provided for generating focus, magnification, and tracking error signals from various combinations of the output signals of the optical sensor elements and the divisions thereof. Apparatus is also provided for either correcting or compensating for magnification errors.

BRIEF DESCRIPTION OF THE DRAWINGS

The above and other objects of the invention, its nature and various advantages, will be apparent upon consideration of the following detailed description, taken in conjunction with the accompanying drawings, in which like reference characters refer to like parts throughout, and in which.

DETAILED DESCRIPTION OF THE INVENTION

Figure 1:
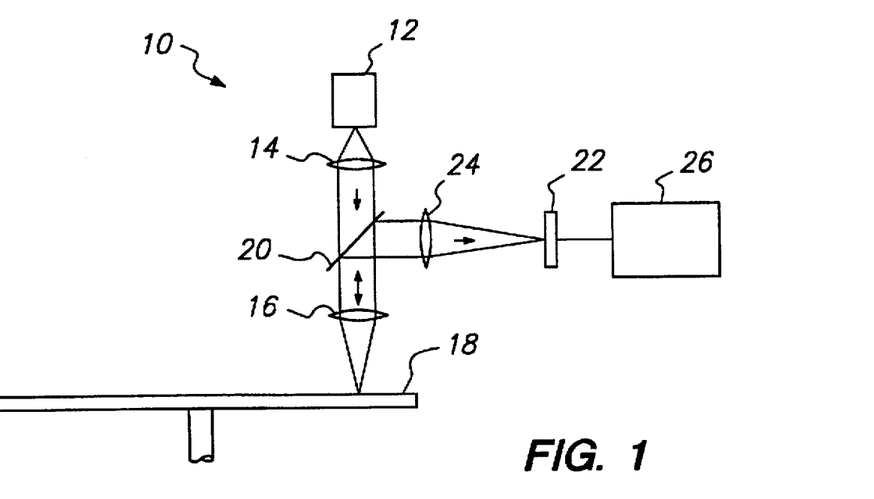
FIG. 1 is simplified diagram of an optical pickup assembly for a multi-track optical disk reader constructed in accordance with the principles of the present invention.

Referring first to FIG. 1, a simplified diagram of a optical pickup assembly 10 for an optical disk reader constructed in accordance with the principles of the present invention is described. Individual components of optical pickup assembly 10 may comprise elements used in conventional CD-ROM drives. Light from light source 12, typically a laser diode, is focused and collimated by lenses 14 and 16 to illuminate a portion of optical disk 18. Optical disk 18 contains a layer (not shown) in which the data is recorded, typically in the form of pits (or bumps) in the data layer. Alternatively, some recordable optical disks use physical or chemical properties of the data layer material, such as its magnetic properties, or its ability to polarize incident light, to record the data.

The light form light source 12 is reflected by the data layer and modulated by the data recorded therein. The reflected light is directed toward optical sensor 22 by beam splitter 20, which may be a half-silvered mirror. Lens 24 may be provided to further focus the reflected light from the surface of optical disk 18 on to optical sensor 22 to convert the image into electrical signals. Processing circuitry 26 decodes and processes the electrical signal generated by optical sensor 22 to recover the data recorded on the optical disk. Additional circuitry, as described, for example, in copending and commonly assigned U.S. patent application Ser. No. 08/339429, converts the data to a format for use by a computer or other processing device and acts as an interface between the optical disk reader and the computing device.

The description of the optical disk reader of FIG. 1 is provided to aid in the understanding of the principles of the present invention. It is understood that many variations and embellishments of the basic optical pickup assembly are possible. For example, beam splitter 20 may be a diffraction grating or half-silvered mirror, and fiber optic wave guides may be used in place of one or more of mirror 20 and lenses 14, 16, and 24. Several possible configurations of optical pickup assemblies are discussed in the aforementioned books by H. Nakajima and K. Pohlmann. The principles of the present invention are not limited to an optical pickup assembly as disclosed in FIG. 1, but are easily adaptable to a wide variety of optical pickup assembly designs.

Figure 2:
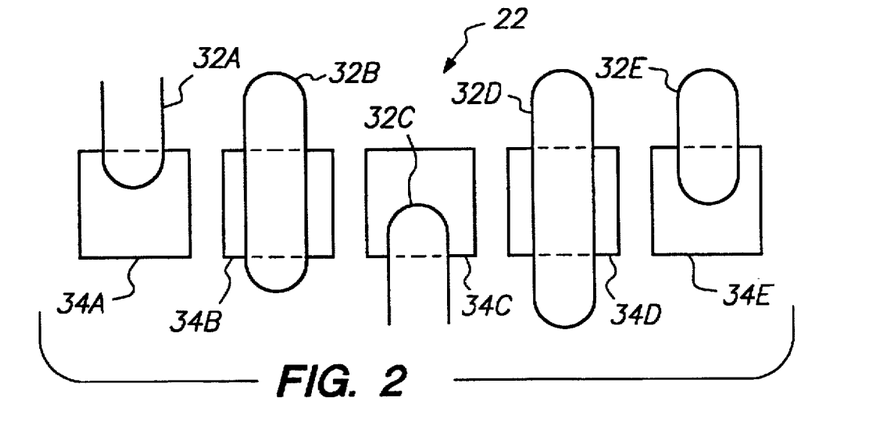
FIG. 2 shows images of adjacent data tracks projected onto corresponding elements of the optical sensor of FIG. 1.

FIG. 2 shows an illustrative embodiment of optical sensor 22 of FIG. 1 constructed in accordance with the principles of the present invention for imaging multiple data tracks of optical disk 18. Optical sensor 22 includes an array of sensor elements, 34A through 34E, one sensor element for each track to be read from the optical disk. In FIG. 2, track images 32A–E, representing portions of adjacent data tracks on optical disk 18, are shown projected onto sensor elements 34A–E and may result from the reflected images produced by a plurality of optical pickup assemblies 10, each having its own optics and laser diode. Alternatively, projected track images 32A–E may be produced by a single laser beam and a diffraction grating which splits the beam into multiple beams, each focused on a different data track. In yet another alternative, projected images 32A–E may be produced by a single set of optics and a wide area illumination source, as described in commonly assigned U.S. Pat. No. 5,426,623.

Each of sensing elements 34A through 34E provides an output signal related to the intensity of the light striking it. As discussed hereinabove, the intensity of the light striking the sensor elements is modulated by the data recorded in the reflective layer of optical disk 18. Therefore, the signals output by sensor elements 34A through 34E are also modulated by the recorded data.

Preferably, optical pickup assembly 10 is designed so that images of the data tracks (i.e. the pits) on the optical disk are focused onto corresponding ones of sensing elements 34A–E. For example, in FIG. 2 track images 32A–E, which correspond to adjacent data tracks on optical disk 18, are properly focused and centered on sensing elements 34A through 34E. In accordance with the principles of the present invention, optical pickup assembly 10 may use multiple individual beams and pickup assemblies of conventional design. Alternatively, optical pickup assembly 10 may use large area illumination as disclosed in commonly assigned U.S. Pat. No. 5,426,623.

Figure 3A:
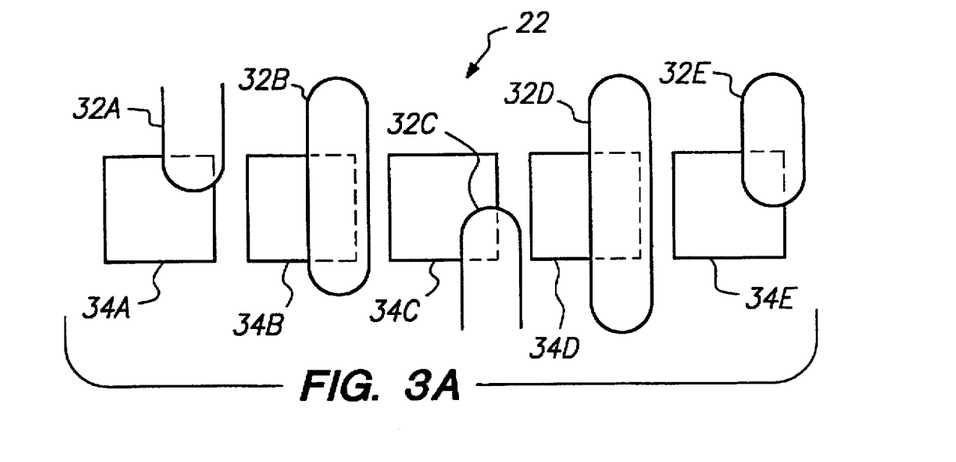
FIGS. 3A and 3B illustrate misalignment between projected track images and sensor elements resulting from, respectively, tracking errors and magnification errors.

Various difficulties may arise in an optical disk reader designed to read multiple tracks simultaneously. For example, an optical pickup assembly may not properly track data tracks on the optical disk, causing track images 32A through 32E to be misaligned with sensor elements 34A through 34E. As shown in FIG. 3A, misalignment caused by tracking errors is characterized by a shift of the entire disk image so that all of track images 32A–E are misaligned by approximately the same amount and in the same direction relative to sensor elements 34A–E. In some cases, the misalignment may be severe enough that some portion of a track image may fall outside its corresponding sensor element. More severe tracking errors may cause a portion of a track image to fall on a sensor element adjacent to the correct sensor element. Misalignments caused by such tracking errors may result in a degradation of the ability of the optical pickup assembly to accurately and reliably read the data recorded on the optical disk.

Referring again to FIG. 1, optical pickup assembly 10, including lenses 16 and 24 as well as mirror 20, projects images of pits in the surface of disk 18 onto optical sensor 22. The magnification of an optical system is the ratio of the angle subtended by the image to the angle subtended by the object and is a function of the focal lengths of the components in the optical system. Preferably, the magnification of the pit images due to the optical path between optical disk 18 and optical sensor 22 is such that the spacing between the projected images of adjacent tracks matches the spacing between adjacent sensor elements. For example, in FIG. 2, the track image spacing is approximately the same as the sensor elements spacing, so that track images 32A–E are centered on corresponding sensor elements 34A–E.

However, optical pickup assembly 10 is typically a manufactured assembly consisting of multiple individual parts. Manufacturing tolerances, temperature changes, and component aging may alter the relative positions of the component parts of optical pickup assembly 10, thereby causing the magnification of optical pickup assembly 10 to vary from one assembly to the next, or even during the lifetime of a single assembly. Therefore, it is probable that the magnification of the optical path from disk 18 to optical sensor 22 is not ideal, and projected track images 32A–E are not aligned with their corresponding sensor elements.

Figure 3B:
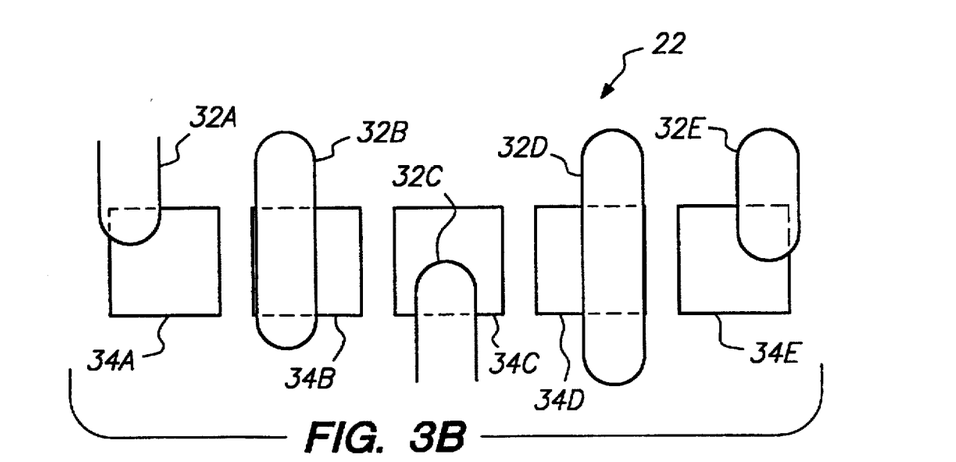

For example, optical pickup assembly 10 may excessively magnify the image of optical disk 18, causing track images 32A–E to be misaligned with their corresponding sensor elements. This is illustrated in FIG. 3B, wherein optical pickup assembly 10 overmagnifies the image of the disk surface, i.e. the magnification is too high. As illustrated, optical pickup assembly 10 tracks data tracks so that track image 34C is aligned with sensor element 32C. However, track images 34A, 34B, 34D, and 34E, corresponding to data tracks adjacent to the track imaged in track image 34C, are not properly aligned with their corresponding sensor elements. Rather, the spacing between the images is increased, thereby displacing track images 34A, 34B, 34D, and 34E away from track image 34C.

Similar effects may be caused by variations in track pitch. For example, the CD-ROM specification provides for a track pitch of 1.5±0.1 microns. Thus, an optical pickup assembly that correctly projects track images when reading an optical disk having a track pitch of 1.4 microns will appear to have an over-magnification error when reading an optical disk having a track pitch of 1.6 microns. Even small variations in track pitch may cause significant errors when reading a number of tracks in parallel. For example, a track pitch variation of 0.1 micron can result in a total variation of up to 1.0 micron across ten adjacent data tracks being read in parallel. As used herein, the term magnification error refers to errors caused by either optical magnification and/or track pitch variation.

Misalignment between track images and optical sensor elements due to tracking and/or magnification errors may increase the rate of errors in reading data from optical disk 18. Although optical disks are encoded with redundant information, providing a certain degree of error detection and correction, excessive read errors may require portions of a data track to be read again. Rereading data necessarily slows the overall data transfer rate and, therefore, negatively impacts the ability to achieve high data transfer rates through simultaneously reading multiple data tracks.

Figure 4A:
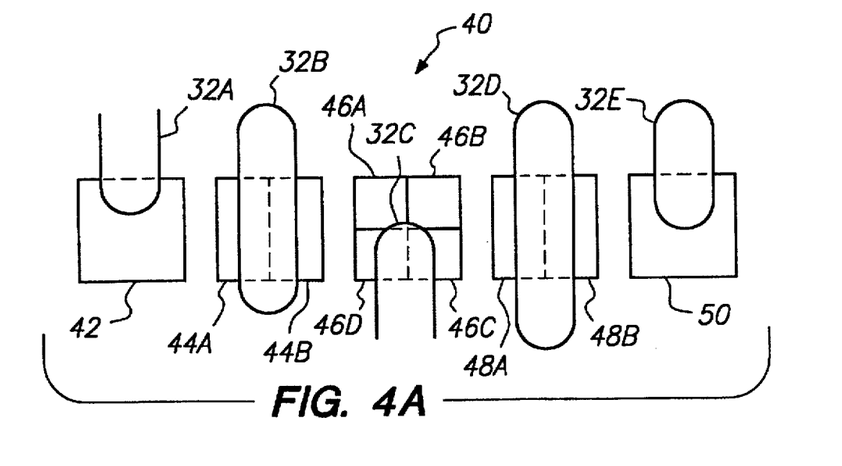
FIGS. 4A through 4C show track images projected onto an illustrative embodiment of a multi-element, multi-division, sensor in accordance with the principles of the present invention.
Figure 4B:
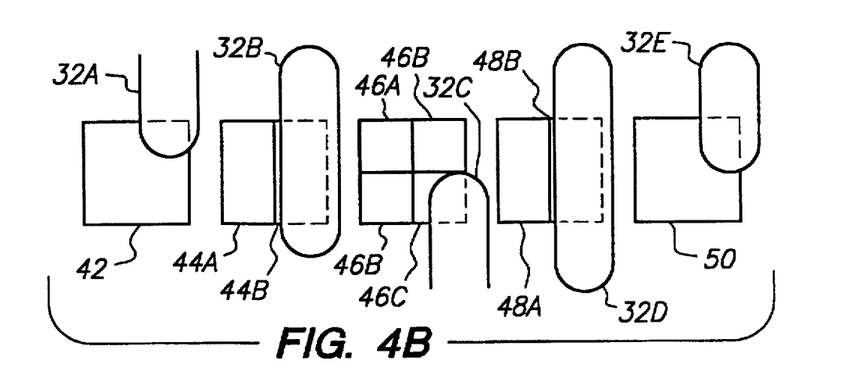
Figure 4C:
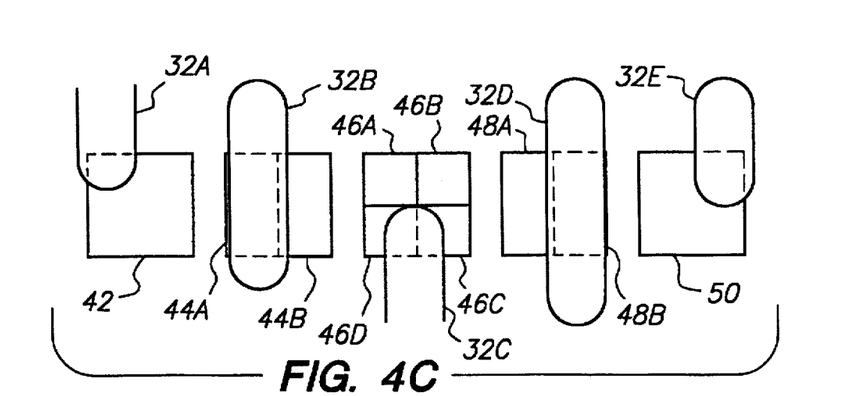

Referring now to FIGS. 4A–C, track images 32A–E are shown projected onto exemplary optical sensor 40. FIG. 4A represents the ideal projection of track images 32A–E, whereas FIG. 4B and 4C show the images projected in the presence of tracking and magnification errors, respectfully. In accordance with the principles of the present invention, sensor 40 includes an array of sensor elements, for example photodiodes, which may include multiple divisions. In a preferred embodiment of optical sensor 40, central optical sensor element 46 is a split photodiode having four divisions, 46A–D, and optical sensor elements 44 and 48 are split photodiodes having two divisions, 44A–B and 48A–B, as shown in FIG. 4A. Each photodiode, or each division of a split photodiode, is electronically biased so that it outputs a signal proportional to the intensity of the image incident on the sensor element or division thereof. The multi-element, multi-division design of optical sensor 40 provides a set of signals which may be combined to determine the presence of focus, tracking, and magnification errors while reading optical disk 18.

Figures 5, 6A, 6B, 6C:
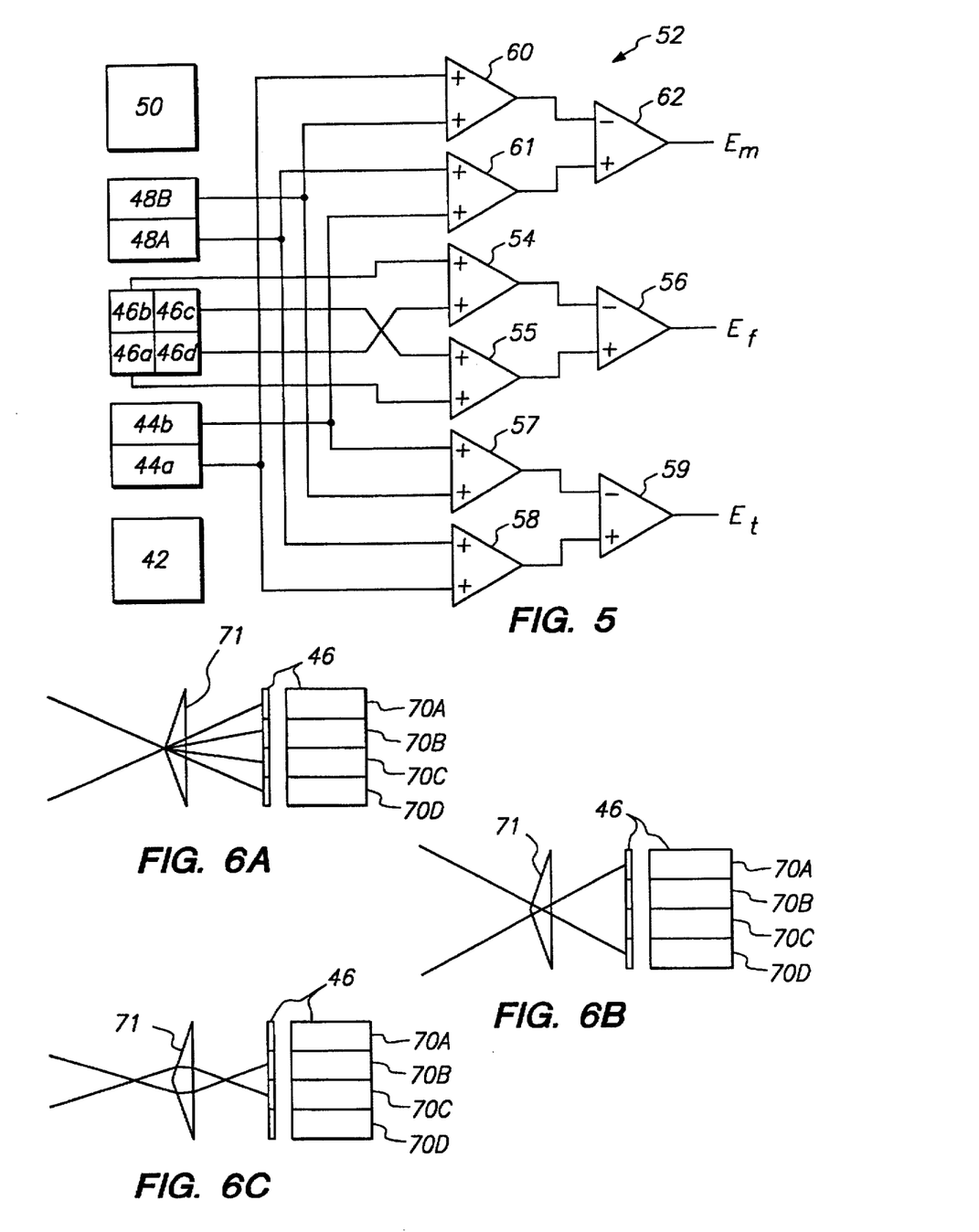
FIG. 5 is a schematic block diagram of circuitry for extracting tracking, focus, and magnification error signals from the output of a multi-element sensor of FIGS. 4A through 4C.
FIGS. 6A through 6C are illustrative embodiments of an alternative focus error detection method.

Referring now to FIG. 5, circuitry 52, comprising a plurality of summing circuits, uses signals from photodiodes 44A–B, 46A–D, and 48A–B to calculate error signals indicative of focus, tracking, and magnification errors as described hereinbelow. Although not shown in FIG. 5, each of the error signals is preferably low-pass filtered to remove unwanted high frequency components and provide a more stable error signal. The error signals may then be used by an optical disk reader's focus, tracking, and magnification compensation systems to compensate for the errors.

For example, summing amplifiers 54, 55, and 56 of circuitry 52 calculate a focus error signal, $E_f$, from the difference between the sums of the diagonally opposite divisions of photodiode 46:

$$E_f = (46A + 46C) - (46B + 46D) \tag{1}$$

using the well known astigmatism method of focus error detection, as described in Chapter 6, pages 140–14, of the aforementioned Nakajima text. Ideally, a projected track image is centered on sensor element 46, so that each division of sensor element 46 receives substantially equal illumination, and, according to equation (1), $E_f$ is zero. However, if a focus error exists, the track image is distorted—stretched along one diagonal of sensor 46 and contracted along the other—and one diagonal pair of the divisions of photodiode 46 receives more illumination that the other pair. Thus, $E_f$ has a non-zero value in the presence of a focus error. A focus servo system may then reposition lenses 16 and 24 of FIG. 1 based on the value of $E_f$ thereby refocusing the images onto detector 22.

One skilled in the art will recognize that other focus detection methods may be used within an optical disk reader according to the principles of the present invention. For example, the Foucault method, also described in the Nakajima text at pages 141–142, may be used. In the Foucault method, prism 71 is placed at the focal point of the optical path of pickup assembly 10 and center sensor element 46 comprises two pair of adjacent divisions, 70A/B and 70C/D, as shown in FIG. 6A. A properly focused image, when passed through the prism, will produce two images centered on each pair of sensor divisions 70A/B and 70C/D. However, when the optical pickup assembly is focused too closely, innermost divisions 70B and 70C receive more illumination than divisions 70A and 70D as shown in FIG. 6B. Conversely, FIG. 6C shows that focusing too far away causes outermost divisions 70A and 70D to receive more illumination. The output signals of sensor element divisions 70A–D may be combined according to the formula $$E_f = (70B + 70C) - (70A + 70D) \quad (2)$$

to produce a focus error signal, $E_f$, which may again be used by a focus servo control system to maintain system focus. Though not shown, circuitry similar to that shown in FIG. 5 may be used to implement the calculation of equation (2).

In addition to generating a focus error signal, circuitry 52 of FIG. 5 also combines the outputs of multi-division photodiodes 44 and 48 to generate tracking error signal, $E_t$. Specifically, summing amplifiers 57, 58, and 59 derive $E_t$ from the output signals of multi-division photodiodes 44 and 48 according to the following equation:

$$E_t = (44A + 48A) - (44B + 48B) \quad (3)$$

Ideally, reflected track images projected onto optical sensor elements 44 and 48 are approximately centered on the optical sensor elements so that optical sensor element divisions 44A and 44B receive equal illumination levels, as do divisions 48A and 48B. Under conditions of equal illumination, the parenthesized terms of equation (3) are nearly equal and $E_t$ is approximately zero.

However, if a tracking error is present, as shown in FIG. 4B, the parenthesized terms are unequal and $E_t$ is not zero. In FIG. 4B, a tracking error is evidenced by the rightward displacement of all track images with respect to their corresponding sensor elements. In particular, track images 32B and 32D fall almost entirely onto the right hand divisions of sensor elements 44 and 48, respectively (i.e. onto divisions 44B and 48B) and none of the images fall onto the left hand divisions. Since the presence of a data pit causes a reduction in the reflected light, divisions 44B and 48B have a smaller output signal relative to the output signals of sensor element divisions 44A and 48B. From equation (3), $E_t$ will, therefore, have a positive value. Conversely, if track images 32B and 32D had been displaced to the left, so that they fell on sensor divisions 44A and 44B, then $E_t$ would have a negative value. Thus, tracking error signal, $E_t$, indicates both direction and magnitude of any tracking error present, and may be used as an input to a tracking servo system to maintain proper tracking of optical pickup assembly 10 in a multi-track optical disk reader.

Still referring to FIG. 5, circuitry 52 also combines output signals from the divisions of optical sensor elements 44 and 48 to determine the presence of magnification errors. Specifically, the magnification error, $E_m$, calculated by summing amplifiers 60, 61 and 62 according to the equation:

$$E_m = (44B + 48A) - (44A + 48B) \quad (4)$$

FIG. 4C shows track images projected onto optical sensor elements 42–50 in the presence of an over-magnification error. The magnification error causes the separation between adjacent track images to be increased relative to the inter-sensor spacing. As shown, track images 32B and 32D fall almost entirely onto optical sensor element divisions 44A and 48B, respectively. This causes divisions 44A and 48B to have an output signal relatively smaller than the output signals of divisions 44B and 48A. Thus, the first term of equation (4) is greater than the second and the magnification error signal, $E_m$, is positive. Conversely, under conditions of under-magnification, track images 32B and 32D fall onto divisions 44B and 48A, respectively, and the magnification error signal is negative. $E_m$ may also then be used as an input to a servo mechanism to correct or compensate for the presence of magnification errors.

Figure 7A:
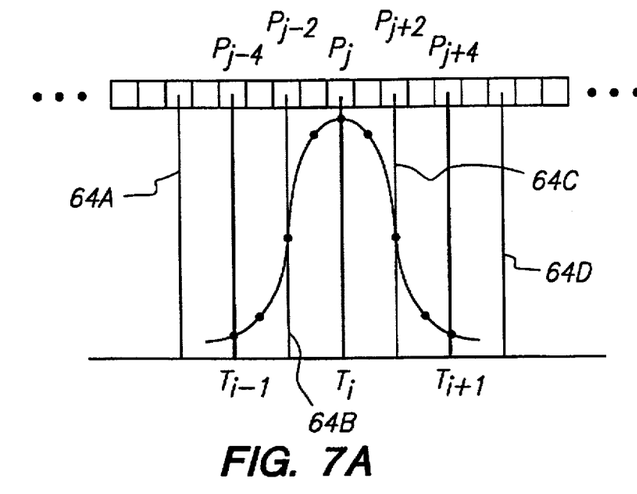
FIGS. 7A and 7B illustrate an alternative method of determining magnification errors.
Figure 7B:
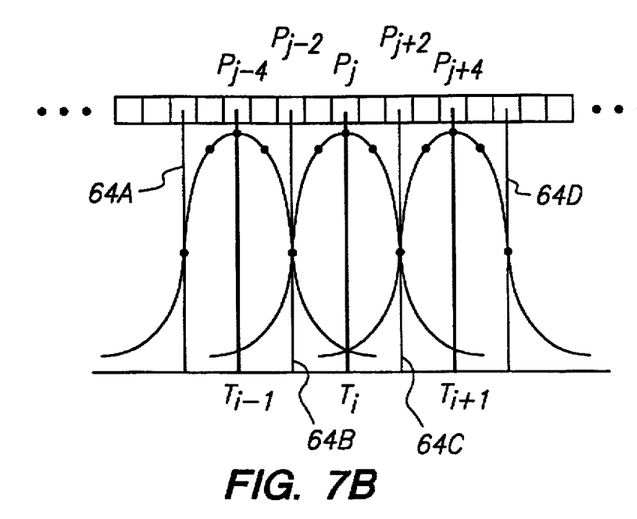

An alternative embodiment of an optical sensor that may be used to detect magnification errors is disclosed in co-pending, commonly assigned, application Ser. No. 08/559,419, filed Nov. 15, 1995, the disclosure of which is incorporated herein in its entirety by this reference. That application discloses methods and apparatus wherein an image of multiple data tracks is projected onto an optical sensor comprising a matrix of sensor elements, such as a CCD matrix. The optical transfer function of a single sensor element, $P_j$, and of several adjacent elements are shown in FIGS. 7A and 7B, respectively. As shown in FIG. 7A, track $T_i$ provides some illumination to sensor elements adjacent to sensor element $p_j$. Similarly, sensor element $p_j$ receives some illumination from tracks $T_{i-1}$ and $T_{i+1}$ adjacent to track $T_i$.

The outputs of the optical sensor elements are processed to determine the center of the lands 64A–D between adjacent data tracks and thereby locate the track centers. Ideally, the magnification of optical pickup assembly 10 of FIG. 1 is such that the centers of projected track images $T_{i-1}$, $T_i$, and $T_{i+1}$ fall directly onto the center of elements of the sensor matrix rather than midway between adjacent elements of the matrix. Therefore, a magnification error signal may be generated based on the locations of the centers of the projected tracks relative to the sensor elements of the matrix.

Figure 8:
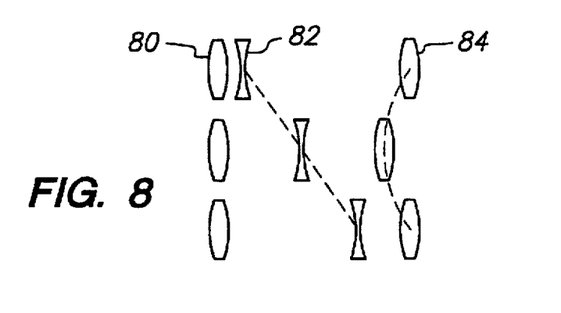
FIG. 8 shows an embodiment of a variable power optical system.
Figure 9:
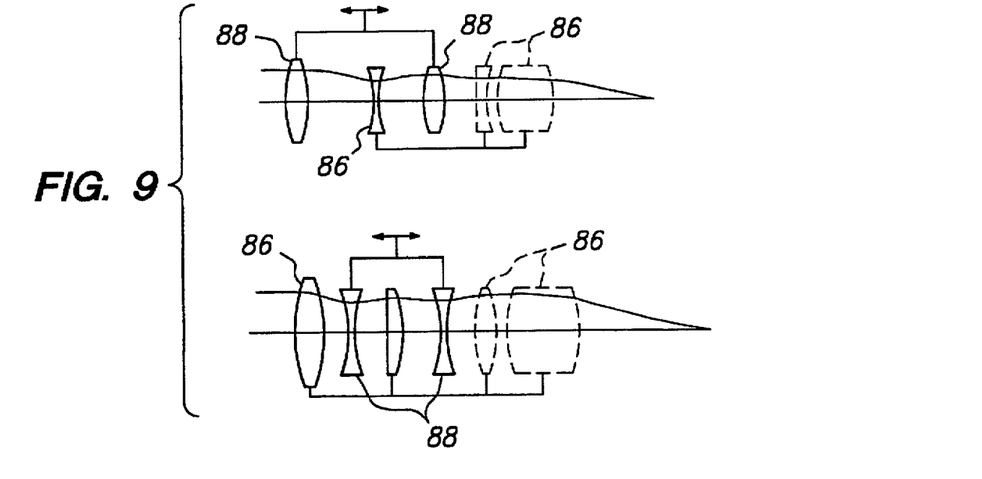
FIG. 9 shows alternative embodiments of a variable power optical system.

Once a magnification error has been determined, various methods and mechanisms may be employed to correct or compensate for the error. In a first embodiment of a magnification error correction system, optical pickup assembly 10 of FIG. 1 is provided a capability to vary its optical power or magnification, i.e., a zoom lens. FIGS. 8 and 9 show two illustrative methods of providing a variable power optical system. In FIG. 8, lens 80 remains stationary while lens 82 is moved axially to vary the power of the optical system. Moving lens 82 causes a shift in the image plane, so lens 84 must be moved to counteract the image plane shift. In the system of FIG. 8, the position of lens 84 is a nonlinear function of the position of lens 82, which may complicate the design.

Referring now to FIG. 9, two alternative variable power optical systems are shown, comprising a series of alternately fixed lenses 86 and movable lenses 88. Movable lenses 88 are linked together, and move axially as a unit to vary the power of the optical system. Some shifting of the image plane occurs as the power is varied, but over small ranges of power change, the image plane shift is small. Additional lenses may be added to reduce image plane shift.

Figure 10A:
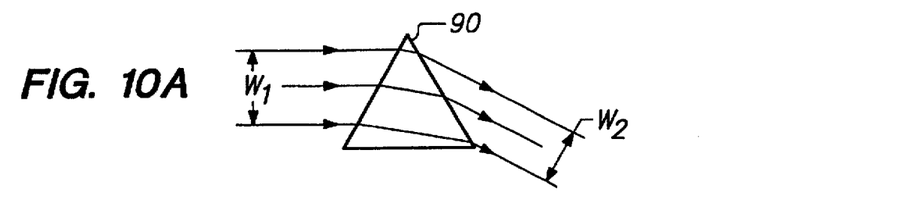
FIGS. 10A and 10B illustrate the use of prisms in an anamorphic, variable power optical system.
Figure 10B:
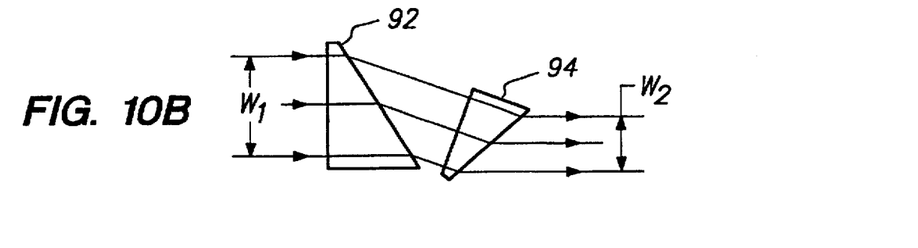

Yet another embodiment of a magnification error correction mechanism of the present invention is shown in FIGS. 10A and 10B. As shown in FIG. 10A, prisms 90 may be inserted into the optical path between the surface of optical disk 18 and detector 22. Prism 90 may be used as anamorphic lenses, wherein the prism magnifies the track images in a single dimension. For example, reducing the width of the track images from $w_1$ to $w_2$. Since, the power of prism 90 is determined by the angle of its faces with respect to the optical path, its power may be varied by rotating prism 90 about a line parallel to its axis, thereby compensating for the magnification errors.

However, prism 90 also causes an angular deviation of the incident light that is a function of the angle of the prism faces with respect to the light. As illustrated in FIG. 10B, a second prism may be used to eliminate or reduce the angular deviation. Thus, by suitably rotating prism 94 it can be made to counteract the angular deviation introduced by prism 92. It should be noted that the light exiting prism 94 has a lateral offset relative to the rays entering prism 92. Small offsets may appear as a tracking error which may be compensated for by the tracking subsystem as described herein above. Further details and designs of variable power systems using lenses and/or prisms may be found in Chapter 9 of *Modern Optical Engineering*, Warren J. Smith, McGraw-Hill Book Company, New York, 1966, which is incorporated herein by this reference.

Figure 11:
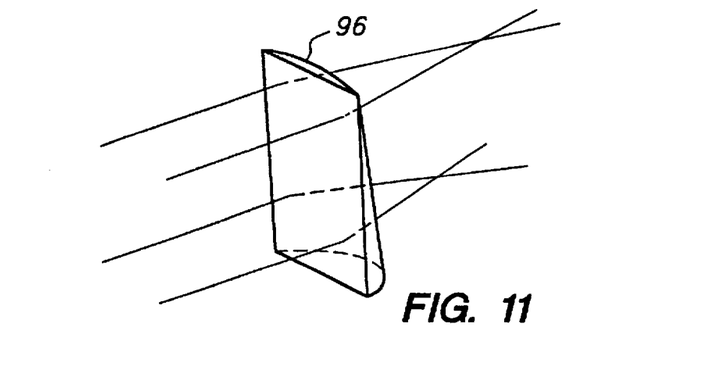
FIG. 11 is an illustrative embodiment of a cylindrical lens for use in an alternative embodiment for correcting magnification errors in an optical pickup assembly.

In a further exemplary embodiment of a variable power optical system, cylindrical lens 96 may be used wherein the radius of curvature of the lens varies along a length of the lens as shown in FIG. 11. Cylindrical lens 96 is positioned in the optical path such that its flat face is perpendicular to the optical path and its axis is perpendicular to the line of the sensor elements. As with the prisms of FIGS. 11A and 11B, a cylindrical lens provides magnification in only a single dimension, wherein the degree of magnification is determined by the radius of the curved surface of the lens. By using a lens in which the curvature varies along its length, the horizontal magnification of the images may be controlled through vertical movement of the variable radius cylindrical lens.

Figure 12:
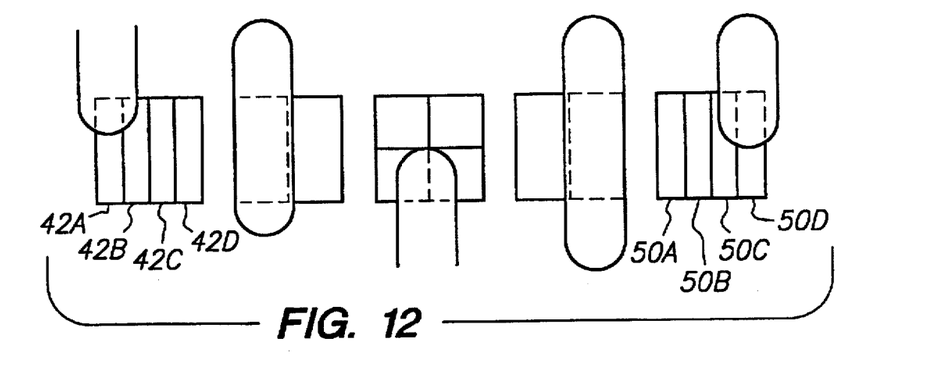
FIG. 12 is an illustrative embodiment of an optical sensor for providing electronic magnification error compensation.

The systems for correcting magnification errors discussed hereinabove work by changing the magnification or optical power of optical pickup assembly 10, of FIG. 1. Alternatively, an optical disk reader may compensate for the magnification error by effectively changing the spacing of the sensor elements in optical sensor 22. In a first embodiment of a system using magnification error compensation, sensor elements 42 and 50 are each comprised of multiple divisions (42A–D and 50A–D), as shown in FIG. 12. The magnification error signal, $E_m$, generated from the outputs of sensor elements 46 and 48 as described above in connection with FIG. 5, is used to selectively combine the outputs of sensor divisions 42A–D and 50A–D, as follows:

$$S_{42} = \begin{cases} 42A + 42B + 42C & \text{if } E_m > \text{threshold} \\ 42B + 42C + 42D & \text{if } E_m < -\text{threshold} \\ 42B + 42C & \text{otherwise} \end{cases} \quad (5)$$

and, $$S_{50} = \begin{cases} 50A + 50B + 50C & \text{if } E_m > \text{threshold} \\ 50B + 50C + 50D & \text{if } E_m < -\text{threshold} \\ 50B + 50C & \text{otherwise} \end{cases} \quad (6)$$

For example, if the magnification error is larger than threshold the divisions 42A–C of optical sensor element 42 are used, whereas an error signal near zero will cause just center divisions 42B and 42C of optical sensor element 42 to be used. In effect, a system using sensor elements as shown in FIG. 6 electronically adjusts the effective size and position of sensor elements 42 and 50 to compensate for magnification errors introduced by the optical pickup assembly.

It is contemplated by the inventors that additional sensor element divisions may be needed to provide finer control over magnification compensation, especially when reading a large number of tracks simultaneously (e.g. more than 5). In the extreme, distinct optical sensor elements 42–50 may be replaced with an array of contiguous sensor elements. For example, a sensor array comprising a charge-coupled device (CCD) may be used as disclosed in co-pending, commonly assigned, application Ser. No. 08/559,419, filed Nov. 15, 1995, the disclosure of which is incorporated herein in its entirety by this reference.

The above incorporated application discloses how to derive multiple data track signals using a CCD array in which each track image is projected onto multiple adjacent pixels in the CCD array. Pixels corresponding to the center of the projected data tracks are then determined and a weighted sum of adjacent pixel output signals are subtracted from the center pixel output signal to compensate for cross-talk between adjacent data tracks. In accordance with the principles of the present invention, the weights used in the cross-talk compensation scheme may be adjusted based on any magnification error that may be present.

Figure 13A:
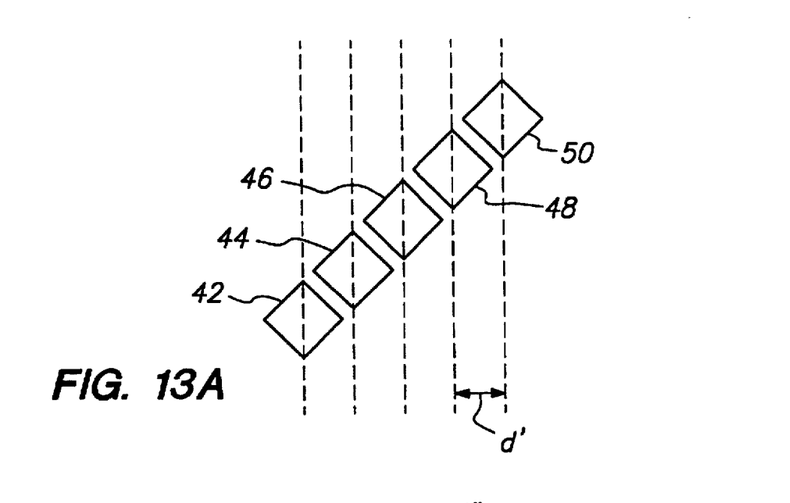
FIGS. 13A and 13B illustrate a mechanical method of compensating for magnification errors.
Figure 13B:
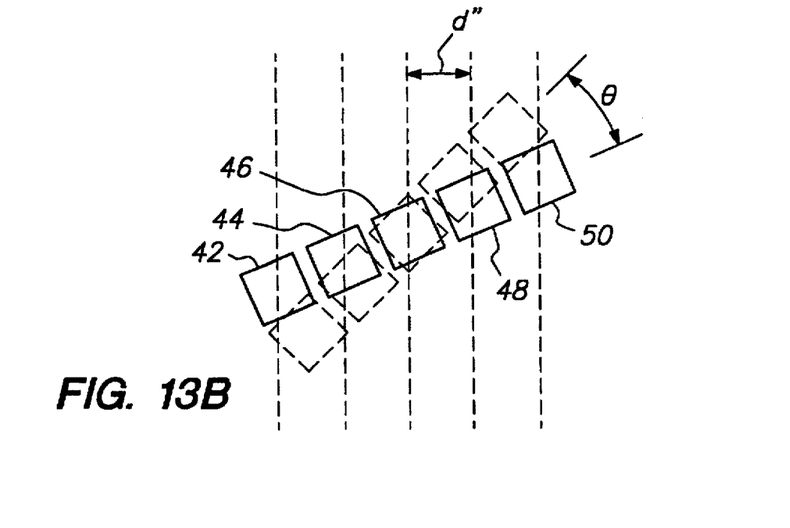

An alternative embodiment of a magnification error compensation system is described with respect to FIGS. 13A and 13B. In this embodiment, sensor elements 42–50 are mounted on a rotatable fixture (not shown) which is rotated, or pivoted, to a particular orientation angle based on the value of $E_m$. The effective spacing of sensor elements 42–50 is dependent on the rotation angle θ, and is given by:

$$d' = d \times \cos(\theta) \quad (7)$$

where d is the inter-sensor element spacing, and d' is the effective inter-element spacing. For example, in FIG. 13A, sensor elements 42–50 are oriented at a 45° angle relative to the direction of track image motion, thus the effective interelement spacing is equal to d·cos(45°), or about 71% of d. When the magnification error, $M_e$, indicates excessive magnification, i.e. the track images projected onto optical sensor elements 42–50 are too far apart, a servo system may rotate the array of sensor elements so that they have a larger angle relative to the tracks, as is shown in FIG. 13B. This rotation effectively increases the inter-sensor element spacing between optical sensor elements 42–50, as shown by d".

One skilled in the art will thus appreciate that the present invention may be practiced by other than the disclosed embodiments, which are present for purposes of illustration and not of limitation, and that the present invention is limited only by the claims which follow.

What is claimed is:

1. An optical pickup assembly for reading multiple adjacent tracks of an optical disk, the optical pickup assembly comprising:

sensing means;

means for illuminating a region of a surface of the optical disk;

means for projecting an image of the illuminated region onto the sensing means;

means for providing a magnification error signal responsive to the presence of a magnification error in the image projected on the sensing means; and means for compensating for the magnification error of the image projected on the sensing means responsive to the magnification error signal.

2. The optical pickup assembly of claim 1 wherein the sensing means comprises an array of sensor elements.

3. The optical pickup assembly of claim 2 wherein an output of the array of sensor elements comprises a weighted sum of outputs of selected sensor elements of the array of sensor elements.

4. The optical pickup assembly of claim 3 wherein weights used in computing the weighted sum are determined responsive to the magnification error signal.

5. The optical pickup assembly of claim 2 wherein at least one of the array of sensor elements comprises multiple divisions.

6. The optical pickup assembly of claim 1 wherein the means for projecting has an adjustable magnification level and the means for compensating adjusts the magnification level of the means for projecting.

7. The optical pickup assembly of claim 1 further comprising:
   means for providing a tracking error signal responsive to the presence of a tracking error in the image projected onto the sensing means; and
   means for correcting for the tracking error responsive to the tracking error signal.

8. The optical pickup assembly of claim 1 further comprising:
   means for providing a focus error signal responsive to the presence of a focus error in the image projected onto the sensing means; and
   means for correcting for the focus error responsive to the focus error signal.

9. The optical pickup assembly of claim 1 wherein the means for projecting comprises a plurality of optical components providing an optical path between the illuminated region of the surface of the optical disk and the sensing means.

10. The optical pickup assembly of claim 9 wherein the means for compensating for the magnification error comprises servo means for altering a position of at least one of the plurality of optical components.

11. The optical pickup assembly of claim 10 wherein the at least one optical component is a member of a group consisting of a lens, a mirror and a prism.

12. A method for reading multiple data tracks from an optical disk, the method comprising:
   providing a sensor comprised of a plurality of sensor elements, each sensor element providing an output signal responsive to an amount of illumination incident thereon;
   projecting images of individual ones of the multiple data tracks onto corresponding ones of the plurality of sensor elements;
   generating a magnification error signal responsive to the sensor element output signals indicating the presence of a magnification error; and
   compensating for the magnification error responsive to the magnification error signal.

13. The method of claim 12 further comprising the steps of:
   generating a tracking error signal responsive to the sensor element output signals indicating the presence of a tracking error; and
   adjusting the projection of the images of individual ones of the multiple data tracks to correct the tracking error.

14. The method of claim 12 further comprising the steps of:
   generating a focus error signal responsive to the sensor element output signals indicating the presence of a focus error; and
   adjusting projection of the images of individual ones of the multiple data tracks to correct the focus error.

15. The method of claim 14 wherein the step of projecting images of individual ones of the multiple data tracks comprises:
   illuminating a region of the optical disk, including a least a portion of the multiple data tracks, wherein at least a portion of the illumination is reflected by the optical disk; and
   providing a plurality of optical components to direct the illumination reflected from the optical disk onto the sensor elements.

16. The method of claim 15 wherein at least one of the sensor elements comprises multiple divisions, at least some of the multiple divisions providing output signals, and wherein the step of generating a magnification error signal comprises combining the output signals of at least some of the multiple divisions.

17. The method of claim 16 wherein the step for compensating for the magnification error comprises altering a position or orientation of at least one of the optical components responsive to the magnification error signal.

18. The method of claim 12 wherein the step of compensating for the magnification error comprises changing an effective spacing between adjacent ones of the plurality of sensor elements.

19. The method of claim 18 wherein at least one of the plurality of sensor elements comprises multiple divisions, at least some of the multiple divisions providing output signals, and wherein the step of changing an effective spacing between adjacent ones of the plurality of sensor elements comprises selectively combining at least some of the output signals responsive to the magnification error signal.

20. The method of claim 18 wherein the sensor elements are mounted on a rotatable support, and wherein the step of changing the effective spacing between adjacent ones of the plurality of sensor elements comprises rotating the rotatable support.

21. The method of claim 12 further comprising a step of performing a weighted sum of the outputs of at least some of the plurality of sensor elements, wherein the step of compensating for the magnification error comprises adjusting weights used in performing the weighted sum.

22. Apparatus for reading multiple data tracks from an optical disk, the apparatus comprising:
   a sensor comprising a plurality of sensor elements, each sensor element providing an output signal responsive to an amount of illumination incident thereon;
   a plurality of optical components for projecting images of individual ones of the multiple data tracks onto corresponding ones of the plurality of sensor elements;
   circuitry for generating a magnification error signal responsive to the output signals of the plurality of sensor elements, the magnification error signal being indicative of the presence of a magnification error; and
   a servo system for compensating for the magnification error responsive to the magnification error signal.

23. The apparatus of claim 22 further comprising:
   circuitry for generating a focus error signal responsive to the output signals of the plurality of sensor elements indicating the presence of a focus error;
   a servo system for adjusting the optical elements to correct for the focusing error.

24. The apparatus of claim 22 further comprising:
   circuitry for generating a tracking error signal responsive to the output signals of the plurality of sensor elements indicating the presence of a tracking error; and
   a servo system for adjusting the optical elements to correct for the tracking error.

25. The apparatus of claim 22 further comprising:
   a source of illumination for illuminating a region of the optical disk, the region including at least a portion of the multiple data tracks, at least a portion of the illumination illuminating the region being reflected by the optical disk so that the plurality of optical components project an image of the region onto the plurality of sensor elements.

26. The apparatus of claim 22 wherein at least one of the sensor elements comprises multiple divisions, each of the multiple divisions providing an output signal, and the circuitry for generating a magnification error signal comprises circuitry for combining the output signals of the multiple divisions.

27. The apparatus of claim 22 wherein the servo system for compensating for the magnification error comprises a servo system for altering a position or orientation of at least one of the optical components responsive to the magnification error signal.

28. The apparatus of claim 22 wherein the servo system for compensating for the magnification error comprises a servo system for changing an effective spacing between adjacent ones of the plurality of sensor elements.

29. The apparatus of claim 28 wherein at least one of the sensor elements comprises multiple divisions, each of the multiple divisions providing an output signal, and the servo system for changing the effective spacing between adjacent ones of the plurality of sensor elements comprises circuitry for selectively combining the output signals of the multiple divisions responsive to the magnification error signal.

30. The apparatus of claim 28 wherein the plurality of sensor elements are mounted on a rotatable support, and the servo system for changing the effective spacing between adjacent ones of the plurality of sensor elements comprises a servo for rotating the rotatable support.

* * * * *